Patented June 26, 1951

2,558,703

UNITED STATES PATENT OFFICE 2,558,703

PREPARATION OF TRIFLUOROTRICHLOROPROPENE

Carl I. Gochenour, Niagara Falls, N. Y., assignor to Hooker Electrochemical Company, Niagara Falls, N. Y., a corporation of New York No Drawing. Application January 6, 1948, Serial No. 818

5 Claims. (Cl. 260—653)

The present invention relates to a method for the fluorination of hexachloropropene, and is more particularly concerned with the fluorination of hexachloropropene to produce high yields of trifluorotrichloropropene, and especially 1,1,1-trifluoro-2,3,3-trichloro-2,3-propene

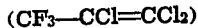
($CF_3$—$CCl$=$CCl_2$)

It has been proposed to fluorinate hexachloropropene with antimony (III) fluoride and a catalyst, and this method of fluorination, although operative, is too expensive for economic commercialization. It has also been proposed previously to fluorinate hexachloropropene by heating it together with a fluoromethane and an aluminum halide to accomplish exchange of the fluorine atom or atoms in the fluoromethane and halogen atoms other than fluorine in the hexachloropropene. This process is more fully disclosed in United States Patent 2,404,706, issued July 23, 1946. The halogen-interchange reaction between a fluoromethane and trihalomethyl ethylenic compounds, however, has obvious disadvantages, namely, the necessity of employing an aluminum halide, and that the process demands two separate steps, i. e., the production of the fluoromethane, and reaction of the trihalomethylethylenic compound therewith. It has heretofore been considered that an allyl halide, such as hexachloropropene, cannot be fluorinated with hydrogen fluoride because the first step of such a reaction is addition to the double bond or because HF is an active allyl polymerization catalyst. Thus, methallyl chloride and hydrogen fluoride react to form the chlorofluoride

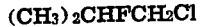
($CH_3$)$_2CHFCH_2Cl$ (Organic Reactions, New York, John Wiley and Sons, Inc., 1944, volume II, page 52).

However, in direct contrast to the published findings of prior investigators, I have found that hydrogen fluoride and hexachloropropene may be reacted, under certain conditions, to produce exceedingly high yields, up to 77 per cent, of trifluorotrichloropropene, without addition to the double bond.

The conditions which I have found necessary for the fluorination reaction are as follows:

1. The use of substantially anhydrous hydrogen fluoride.

2. A reactant ratio of at least three moles of hydrogen fluoride for each mole of hexachloropropene. When less than three moles of hydrogen fluoride per mole of hexachloropropene are employed, conversions to trifluorotrichloropropene are unsatisfactory; when more than six moles of hydrogen fluoride to one mole of hexachloropropene are employed, yields of trifluorotrichloropropene are decreased by the entrainment of product in the escaping excess HF. Also, the use of more than 6 moles is economically impractical.

3. The presence of pentavalent antimony halide in catalytic amounts, from about 0.2 to 2.0 per cent by weight of the hexachloropropene being preferred. Representative catalysts are antimony (V) chloride, antimony (V) bromide, antimony (V) fluoride, and antimony (V) chlorofluorides. The antimony (V) chloride or chlorofluorides are preferred. Less than about 0.2 per cent of catalyst is usually not as satisfactory for practical yields; more than about 2.0 per cent does not appreciably increase the yield.

4. A reaction temperature between room temperature, e. g., 20–30 degrees centigrade, and about 100 degrees centigrade; 40–90 degrees centigrade being preferred. Yields of desired product appear to decrease with higher temperatures when operating at atmospheric pressure, due to increased volatility and entrainment of product in the escaping HF.

5. The introduction of the substantially anhydrous hydrogen fluoride into a mixture of catalyst and hexachloropropene. The hydrogen fluoride may be introduced batchwise when the reaction is conducted under superatmospheric pressure; or portionwise or continuously when conducted at atmospheric pressure, preferably the latter, into the mixture until the required amount has been introduced.

6. Agitation of the reaction mixture is required for highest yields. The agitation resulting from introduction of the hydrogen fluoride may be sufficient, but additional agitation is preferred.

7. The pressure preferably should not exceed autogenous, e. g., the vapor pressure of reactants and reaction products under the conditions employed or slightly above. This pressure is attained in a closed autoclave. Pressures lower than autogenous may be utilized, but pressures below atmospheric are not generally satisfactory. Excessively high pressures over and above the autogenous pressures attainable, appear to reduce the yield of desired product, possibly by causing hydrogen fluoride addition to the double bond of the product.

8. The reactor for the process may be one of several types. A rocking autoclave constructed of steel or iron is satisfactory. Alternatively, a reactor of suitable material, e. g., nickel, iron, or copper, equipped with a water or Dry-Ice cooled reflux condenser, a scrubber for neutralizing evolved acids, and a discharge line may be employed. The type of apparatus is not to be construed as limiting the invention.

9. The reaction product may be separated according to conventional procedure for the treatment of halogen-containing reaction products, e. g., by cooling, washing with water, neutralizing with dilute base, drying, and fractionally distilling to isolate the desired 1,1,1-trifluoro-2,3,3-trichloro-2,3-propene.

This invention will be further understood from a consideration of the following illustrative examples, in which the quantities are stated in parts by weight and the yields are given in per cent of theory, based on the hexachloropropene charged.

Example I

Seventy-eight and one-fourth parts of hexachloropropene and 0.7825 part of antimony pentachloride were charged into a nickel-lined reactor which was provided with hydrogen fluoride inlet, agitator, water-cooled reflux condenser, scrubber for neutralizing evolved acids, and a discharge line. Twenty-two and nine-tenths parts of substantially anhydrous hydrogen fluoride was introduced into the agitated reactor at the rate of 1.9 parts per hour over a period of twelve hours. The temperature of the reaction mixture was increased gradually from about twenty-three degrees centigrade at the beginning of the reaction to about forty-seven degrees centigrade at the end of the twelve-hour period. After introduction of the hydrogen fluoride was complete, the reaction products were cooled, washed with water, neutralized with a dilute aqueous solution of sodium hydroxide, separated, dried with soda ash, and fractionally distilled. The forty-eight parts of trifluorotrichloropropene, boiling between 86.5 and 89.7 degrees centigrade, having a specific gravity of 1.6095 at 25/4 and $n_D^{20}$ of 1.4100 was separated, a 76.6 per cent yield.

Example II

Seventy-one parts of hexachloropropene and 0.355 part of antimony pentachloride were charged into an apparatus similar to that used in Example I. Twenty-six parts of anhydrous hydrogen fluoride was introduced into the agitated reactor at the rate of about 1.93 parts per hour over a period of 13.5 hours. The temperature of the reaction mixture was maintained from about 23 degrees centigrade to about 45 degrees centigrade during the course of the reaction. After introduction of the hydrogen fluoride was complete, the reaction products were cooled, washed, neutralized, separated, and dried as in Example I. Fractional distillation of the product separated 36.8 parts of trifluorotrichloropropene boiling between 87 degrees and 89 degrees centigrade, a 64.6 per cent yield.

Example III

Example I was repeated except that 19.5 parts of hydrogen fluoride was introduced at the rate of 1.85 parts per hour for a period of 10.5 hours. Upon fractional distillation of the dry crude product, a 71.4 per cent yield of trifluorotrichloropropene was obtained.

Example IV

Example II was repeated except that 19.75 parts of hydrogen fluoride was introduced at the rate of 2.25 parts per hour for a period of 8.75 hours, the temperature of the reaction being maintained at about 40 degrees centigrade during the course of the reaction. Fractional distillation of the dry crude product gave a 56.6 per cent yield of trifluorotrichloropropene.

Example V

Example I was repeated except that 30.5 parts of hydrogen fluoride was introduced at the rate of 1.97 parts per hour for a period of fifteen and one-half hours. Fractional distillation resulted in a 65 per cent yield of trifluorotrichloropropene.

Example VI

Ten thousand parts of hexachloropropene and 30 parts of pentavalent antimony halide catalyst ($SbF_5$) were charged into an apparatus similar to that used in Example I, except that the reactor was constructed of iron and was not nickel-lined. Three thousand six hundred parts of anhydrous hydrogen fluoride was introduced into the agitated charge over a period of four hours at the rate of 900 parts per hour, and the reaction temperature was increased to 90 degrees centigrade during the reaction. The crude product was treated as in Example I and on fractional distillation yielded 132 parts of trifluorotrichloropropene boiling between 86.9 and 89.9 degrees centigrade.

The results and differences in reaction conditions of the foregoing examples can be more readily observed from the following table:

| Example | Per Cent Catalyst | Moles HF per mole $C_3Cl_6$ | Temperature, °C. | Reaction Period | Yield, $C_3F_3Cl_3$ |
|---|---|---|---|---|---|
| | | | | Hours | Per cent |
| I | 1.0% $SbCl_5$ | 3.65 | 23-47 | 12 | 76.6 |
| II | 0.5% $SbCl_5$ | 4.57 | 23-45 | 12.5 | 64.6 |
| III | 1.0% $SbCl_5$ | 3.10 | 23-47 | 10.5 | 71.4 |
| IV | 0.5% $SbCl_5$ | 3.48 | 40 | 8.75 | 56.6 |
| V | 1.0% $SbCl_5$ | 4.84 | 23-47 | 15.5 | 65.0 |
| VI | 0.3% $SbF_5$ | 4.5 | 90 | 4.0 | 1.65 |

The product of Example VI included difluorotetrachloropropane in a yield of 67.5%. The low yield of trifluorotrichloropropene in Example VI is attributable to the short reaction period, the small proportion of catalyst and the higher temperature.

Various modifications may be made in the present invention without departing from the spirit or scope thereof and it is to be understood that I limit myself only as defined in the appended claims.

I claim:

1. A process for the production of 1,1,1-trifluoro-2,3,3-trichloro-2,3-propene which comprises progressively adding anhydrous hydrogen fluoride to a mixture of hexachloropropene containing suspended therein an amount of pentavalent antimony halide within the range of approximately 0.2 to approximately 2.0 percent by weight of the hexachloropropene, progressively increasing the temperature of the mixture during the addition of the hydrogen fluoride to a maximum within the range of approximately 40 degrees centigrade to approximately 90 degrees centigrade, stopping the addition of the hydrogen fluoride when an amount within the range of approximately three to approximately six molecular proportions of hydrogen fluoride (HF) have been added for each molecular proportion of hexachloropropene, maintaining the temperature after the addition of the hydrogen fluoride between approximately 40 and approximately 90 degrees centigrade for a sufficient period to convert at least 50 percent of the hexachloropropene to 1,1,1-trifluoro-2,3,3-trichloro-2,3-propene, and subsequently recovering the 1,1,1-trifluoro-2,3,3-trichloro-2,3-propene from the reaction product.

2. A process for the production of 1,1,1-trifluoro-2,3,3-trichloro-2,3-propene which comprises progressively introducing approximately 26 parts by weight of anhydrous hydrogen fluoride into an agitated mixture of approximately 71 parts by weight of hexachloropropene and approximately 0.355 part by weight of antimony pentachloride, maintaining the temperature of the reaction mixture within the range of approximately 23 to approximately 45 degrees centigrade for such period that at least 50 percent of the hexachloropropene is converted to 1,1,1-trifluoro-2,3,3-trichloro-2,3-propene, and subsequently recovering the 1,1,1-trifluoro-2,3-trichloro-2,3-propene from the reaction product.

3. A process for the production of 1,1,1-trifluoro-2,3,3-trichloro-2,3-propene from hexachloropropene, which comprises heating hexachloropropene with between approximately 3 and approximately 6 moles of substantially anhydrous hydrogen fluoride per mole of hexachloropropene in the presence of between approximately 0.2 and approximately 2.0 per cent by weight of a pentavalent antimony halide, based on the weight of the hexachloropropene, at a temperature between approximately 20 and approximately 100 degrees centigrade, for such period that at least 50 per cent of the hexachloropropene is converted to 1,1,1-trifluoro-2,3,3-trichloro-2,3-propene, and subsequently separating the 1,1,1-trifluoro-2,3,3-trichloro-2,3-propene from the reaction product.

4. A process as defined in claim 3 in which the heating is conducted at a temperature between approximately 40 and approximately 90 degrees centigrade and the reaction mixture is agitated continuously during the heating period.

5. A process as defined in claim 3 in which the pentavalent antimony halide is antimony pentachloride.

CARL I. GOCHENOUR.

REFERENCES CITED

The following references are of record in the file of this patent:

UNITED STATES PATENTS

| Number | Name | Date |
|---|---|---|
| 2,005,713 | Holt et al. | June 18, 1935 |
| 2,230,925 | Benning | Feb. 4, 1941 |
| 2,404,706 | Harmon | July 23, 1946 |

FOREIGN PATENTS

| Number | Country | Date |
|---|---|---|
| 576,190 | Great Britain | Mar. 22, 1946 |

OTHER REFERENCES

Henne et al., Jour. Am. Chem. Soc., vol. 65, 1271-2 (1943).

Henne et al., Jour. Am. Chem. Soc., vol. 63, 3478-9 (1941).